(No Model.)
R. WYATT.
IMPLEMENT FOR SHARPENING TAILORS' CHALK.
No. 355,243. Patented Dec. 28, 1886.
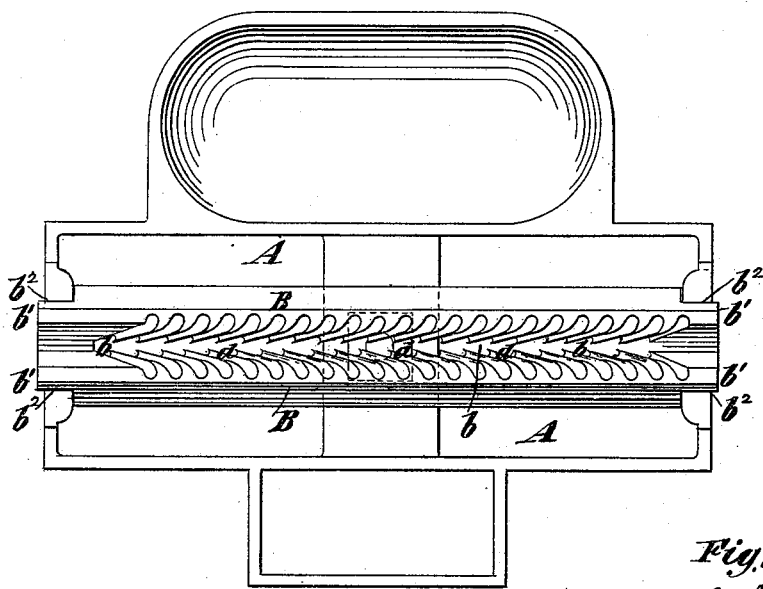
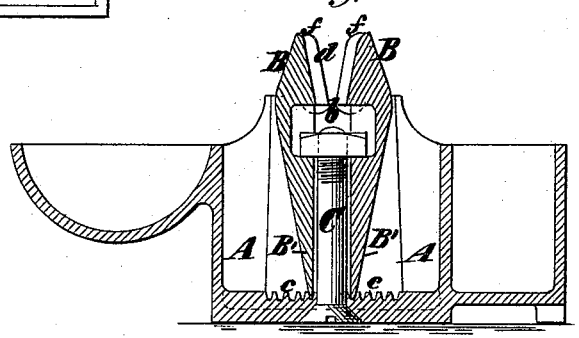
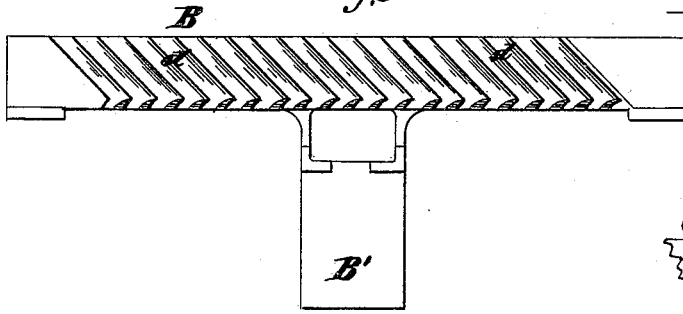
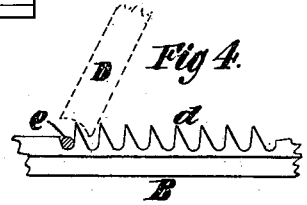
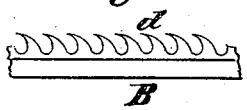
Witnesses.
Emil Hertr.
C. Sundgren
Inventor:
Robert Wyatt
by his Attys
Brown & Hall

UNITED STATES PATENT OFFICE.

ROBERT WYATT, OF NEW YORK, N. Y.

IMPLEMENT FOR SHARPENING TAILORS' CHALK.

SPECIFICATION forming part of Letters Patent No. 355,243, dated December 28, 1886.

Application filed July 13, 1886. Serial No. 207,878. (No model.)

*To all whom it may concern:*

Be it known that I, ROBERT WYATT, of the city and county of New York, in the State of New York, have invented a new and useful Improvement in Implements for Sharpening Tailors' Chalk, &c., of which the following is a specification.

My improved implement or device may be employed for sharpening chalk and other marking crayons or materials for various uses, but is more particularly intended for sharpening the flat, broad pieces of chalk or composition used by tailors and cutters of clothing and other fabrics.

In my pending application for Letters Patent, Serial No. 202,604, filed May 19, 1886, I have shown and described an implement or device for the purpose above described, which comprises two blades or knives having converging faces, so as to give the chalk or other material sharpened a wedge-shaped form when it is drawn between the knives or blades, and such knives or blades are supported by bearings at the ends of a box or receptacle, and have downwardly-projecting arms which engage with retaining notches in the bottom of the box or receptacle and serve to hold the knives or blades with their faces at any desired angle of convergence.

According to my present invention, I prefer to employ a combination of this character, but may use knives or blades secured in any suitable manner within a box or receptacle, or to a base-piece or support of other character.

Important objects of my invention are to provide knives or blades for the purpose above described which are of such character that they will retain their cutting qualities for a long period of time, and also to avoid the breaking off of the chalk, which is liable to occur when it has, in the operation of sharpening, been reduced to a thin edge.

The invention consists in the combination, with a base-piece or support, of two knives or blades secured thereto and having converging faces, each knife or blade consisting of a plate or bar having teeth or sharp ribs which are oblique or inclined relatively to the length of the plate or bar. In the operation of sharpening, the chalk or other material is drawn along between the converging faces of the knives in a direction opposite to their inclination, and hence the teeth have a tendency to lift the chalk, which is counteracted by the downward pressure produced by the hand, and at the same time have the advantage that they cut the chalk with a shearing action or have a raking cut.

The invention also consists in the combination, with a base-piece or support, of two knives or blades secured thereto and having converging faces, each knife or blade consisting of a plate or bar having teeth or sharp ribs which are hooked or have a rake all in the same direction. By forming the teeth or sharp ribs of a hooked form, or with a rake all in the same direction, they cut much more effectively and retain their sharp edges for a longer period of time than when made simply in the form of ratchet-teeth with square faces and inclined backs. I prefer to make the teeth both of hooked form or with a rake all in the same direction, and with an inclination obliquely to the length of the blade.

In the accompanying drawings, Figure 1 is a plan of an implement or device embodying my invention. Fig. 2 is a transverse section thereof. Fig. 3 is a face view of one knife or blade. Fig. 4 is an edge view or plan of a portion of one knife or blade before it is completed by bending over the edges of the teeth or ribs, and Fig. 5 is an edge view or plan of a portion of the complete knife or blade.

Similar letters of reference designate corresponding parts in all the figures.

In this example of my invention I have shown a base-piece or support consisting of a box or receptacle, A; and B B designate the knives or blades, which have converging faces, so as to form between them a V-shaped opening, and which have a slot, $b$, between their lower edges. As here represented, the knives or blades B have at the ends journaled portions $b'$, which are supported in bearings $b^2$ in the ends of the box or receptacle A, and have downwardly-extending arms $B'$, the ends of which enter retaining notches or catches $c$ in the bottom of the box or receptacle, and hold the blades or knives with their faces at the desired angle of convergence. By means of a bolt, C, the knives or blades B may be held in position within the box or receptacle, with their arms B' in secure engagement with certain of the retaining-notches c, as is described in my aforesaid pending application.

My present invention relates solely to the construction and form of the teeth or sharp cutting-ribs d, with which the knives or blades B are provided. As clearly shown, these teeth or cutting-ribs b are arranged obliquely or have an inclination relatively to the length of the knife or blade, and each knife or blade consists of a plate or bar on which these teeth are formed. It is advantageous to have the teeth or sharp cutting-ribs inclined in the manner described and in the same direction in which their cutting-edges are presented, because they then operate with a shearing or raking cut upon the chalk or other material drawn lengthwise between them, and without any tendency to pull or draw the material downward, as would be the case if they were inclined in a reverse direction, and which would result in the sharp edge of the chalk being broken. Teeth or cutting projections arranged obliquely upon the knives or blades are shown in my aforesaid application, but are not claimed therein; and it is now my intention to include teeth or sharp cutting-ribs of any form which are oblique to the length of the knives or blades, and however the knives or blades are secured to their base-piece or support.

I prefer that the teeth or sharp cutting-ribs d shall not only be oblique to the length of the knife or blade, but shall also be bent over, as shown in Figs. 1 and 5, so that they will have a rake all in one direction, and in the same direction in which the teeth or ribs are inclined from the top of the knives or blades downward. When the sharp edges of the teeth or ribs d are presented all in one direction and are bent over so as to give them a rake, they will retain their cutting-edges much longer, and will cut far more rapidly and smoothly than will teeth of ratchet form having square cutting-faces and inclined backs, such as are shown in my aforesaid pending application, and such as have been heretofore used in implements of this class.

I have in Figs. 4 and 5 illustrated a means which may be employed for producing the rake and the form of the teeth or cutting-ribs upon the finished knife or blade, as shown in Figs. 1 and 5.

In making the knives or blades I first produce, either by casting or by drop forging, or otherwise, a blank or incomplete knife, consisting of a plate or bar having the teeth or cutting-ribs d formed without any rake or bent over edges. This form enables the knives or blades to be produced by casting, as the teeth before they are bent over will readily draw from the sand, and, if produced by casting, the knives or blades should be subjected to an annealing operation or converted into malleable iron or steel, in order that the teeth or sharp-edged ribs may be bent without breaking. After the blank, with its teeth or ribs, is produced, I may bend the sharp edges over so as to cause them to be presented all in one direction by means such as are shown in Fig. 4.

D designates a drift or setting-punch, which is placed successively upon the teeth, as shown in Fig. 4, and after a round wire, e, is laid in the space behind such tooth the tooth will, by a blow from the drift or setting-punch, be turned or bent over so as to give it the form shown in Fig. 5. The employment of the wire e prevents the bend in the tooth from taking place at its root, and enables the blow from the punch to simply bend over the edge portion of the tooth, so that it will be presented forward and will, therefore, have a cutting effect similar to the blade of a knife. The teeth or sharp-edged ribs thus formed may be given a sharp cutting-edge by filing or otherwise, and at the top of the knives or blades the teeth have a rounded profile, as shown at f in Fig. 2, so as to produce in the chalk or other material operated upon by them a concave form of edge, which enables the chalk to be readily held in the hand, and gives a slender wedge-shaped transverse section to even a thick piece of chalk or other material.

What I claim as my invention, and desire to secure by Letters Patent, is—

1. The combination, with a base-piece or support, of two knives or blades secured thereto and having converging faces, each knife or blade consisting of a plate or bar having teeth or sharp ribs which are oblique or inclined relatively to the length of the plate or bar, substantially as herein described.

2. The combination, with a base-piece or support, of two knives or blades secured thereto and having converging faces, each knife or blade consisting of a plate or bar having teeth or sharp ribs which are hooked or have a rake all in the same direction, substantially as herein described.

3. The combination, with a base-piece or support, of two knives or blades secured thereto and having converging faces, each knife or blade consisting of a plate or bar having teeth or sharp ribs which are hooked or have a rake all in the same direction, and which have an inclination from the top of the knife or blade downward in the same direction in which their sharp edges are presented, substantially as herein described.

ROBERT WYATT.

Witnesses:
 FREDK. HAYNES,
 MINERT LINDEMAN.